United States Patent
Kim et al.

(10) Patent No.: US 7,421,203 B2
(45) Date of Patent: *Sep. 2, 2008

(54) METHOD FOR TRANSMITTING PACKET IN WIRELESS ACCESS NETWORK BASED ON WAVELENGTH IDENTIFICATION CODE SCHEME

(75) Inventors: Byoung Whi Kim, Kyungki-do (KR); Jea Hoon Yu, Daejeon (KR); Min Ho Kang, Seoul (KR)

(73) Assignee: Electronics and Telecommunications Research Institute (KR)

( * ) Notice: Subject to any disclaimer, the term of this patent is extended or adjusted under 35 U.S.C. 154(b) by 1041 days.

This patent is subject to a terminal disclaimer.

(21) Appl. No.: 10/328,785

(22) Filed: Dec. 23, 2002

(65) Prior Publication Data

US 2004/0004950 A1  Jan. 8, 2004

(30) Foreign Application Priority Data

Jul. 3, 2002 (KR) ...................... 10-2002-0038162

(51) Int. Cl.
*H04B 10/20* (2006.01)

(52) U.S. Cl. ............................. 398/59; 398/83; 398/79; 398/115; 398/116; 398/118; 398/135; 398/66; 398/67; 398/68; 398/69; 398/70; 398/71; 398/72; 398/74; 398/75; 398/76; 398/77; 398/78; 398/82; 398/89; 398/91; 398/99; 398/100; 398/45; 398/48; 398/49; 398/51; 398/58; 398/173; 398/175; 370/406; 370/404; 370/403; 370/401; 370/222; 370/223; 370/224; 370/238; 370/389; 370/350; 370/338; 370/395.1; 370/395.6; 370/346; 370/218; 455/422; 455/445; 455/426.1; 455/426.2; 455/560; 379/321; 379/221; 379/56.1; 340/827; 340/825.01; 385/24; 385/37; 385/16; 385/17; 385/18

(58) Field of Classification Search ................. 398/103, 398/99, 100, 59, 79, 58, 45, 47, 49, 51, 54, 398/57, 115, 126, 83, 66, 67, 68, 69, 70, 398/71, 72, 74, 75, 76, 77, 78, 82, 89, 91, 398/116, 118, 135, 173, 175, 48; 455/3.1, 455/5.1, 4.2, 6.1, 422, 445, 426.1, 426.2, 455/560; 379/56.1, 221, 321; 370/406, 403, 370/404, 401, 222, 223, 234, 238, 228, 216, 370/218, 352, 389, 350, 346, 348, 395.1, 370/395.6, 338; 340/827, 825.01; 385/24, 385/37, 16, 17, 18

See application file for complete search history.

(56) References Cited

U.S. PATENT DOCUMENTS 6,616,349 B1 * 9/2003 Li et al. ........................ 398/4

(Continued)

FOREIGN PATENT DOCUMENTS

KR    1020000079533    7/2001

OTHER PUBLICATIONS

3GPP TS 23.060 V4.2.0 (Oct. 2001), "3rd Generation Partnership Project: Technical Specification Group Services and System Aspects; General Packet Radio Service (GPRS); Service description; Stage 2 (Release 4)".

*Primary Examiner*—Hanh Phan
(74) *Attorney, Agent, or Firm*—Blakely, Sokoloff, Taylor & Zafman (57) ABSTRACT

A method for transmitting a packet in a wireless access network based on a wavelength identification code scheme. The method comprises the steps of connecting n number of RNCs (Radio Network Controllers) to one sub-ring where the "n" is a positive integer, and assigning a unique wavelength to each RNC; identifying a packet to be transmitted between the RNCs located within a same sub-ring using the assigned unique wavelength, and transmitting the packet through an SRC (Sub-Ring Controller); connecting m number of SRCs to one main-ring where the "m" is a positive integer, and assigning a unique wavelength to each SRC; and detaching a wavelength identification code from the packet to be transmitted between the RNCs located within different sub-rings, and transmitting the packet having the encapsulated wavelength identification code through an MRC (Main-Ring Controller).

18 Claims, 8 Drawing Sheets

U.S. PATENT DOCUMENTS 6,728,485 B2 * 4/2004 Pfeiffer ........................ 398/74
6,952,533 B2 * 10/2005 Kim et al. .................... 398/166
7,164,861 B2 * 1/2007 Takachio et al. .............. 398/70
2003/0007214 A1 * 1/2003 Aburakawa et al. ......... 359/145

* cited by examiner

PRIOR ART

METHOD FOR TRANSMITTING PACKET IN WIRELESS ACCESS NETWORK BASED ON WAVELENGTH IDENTIFICATION CODE SCHEME

BACKGROUND OF THE INVENTION

1. Field of the Invention

The present invention relates to a method for transmitting a packet in a packet-mode wireless access network, and more particularly to a method for transmitting a packet in a packet-mode wireless access network, which can guarantee a bandwidth by assigning a unique wavelength to each RNC (Radio Network Controller) in a packet-mode wireless access network, improve access network utilization and simplify packet transmission by transmitting/receiving the packet being identified by the unique wavelength, and provide high-speed paging and broadcasting services by commonly assigning a specific shared wavelength to all RNCs.

2. Description of the Related Art

Recently, as numbers of wireless Internet users and a demand of multimedia services increase, a need for large-capacity packet transmission services has increased. Further, a B-ISDN (Broadband Integrated Services Digital Network) is being rapidly developed to accommodate a variety of services such as e-mail services, e-commerce services, moving image services for Internet broadcasting, remote image conference services, home shopping services, on-line real-time game services, home networking services, etc. Therefore, it is important that wireless Internet services of more than several Mbits/s per mobile terminal subscriber should be supported for the sake of the large-capacity packet transmission in a wireless access network.

A conventional access network between a base station and a backbone network is based on a point-to-point connection structure through an ATM (Asynchronous Transfer Mode)/SDH (Synchronous Digital Hierarchy)/SONET (Synchronous Optical Network) interface. Further, a packet transmission process is complicated in the conventional access network and the capacity of the conventional access network cannot accommodate a fourth generation mobile communication system, which guarantees a bandwidth of more than several Mbits/s per mobile subscriber. The capacity of the backbone network is sufficient for a current wired network, but high-speed data services of large capacity cannot be provided to a mobile terminal subscriber because the capacity of the conventional access network is limited.

Figure 1:
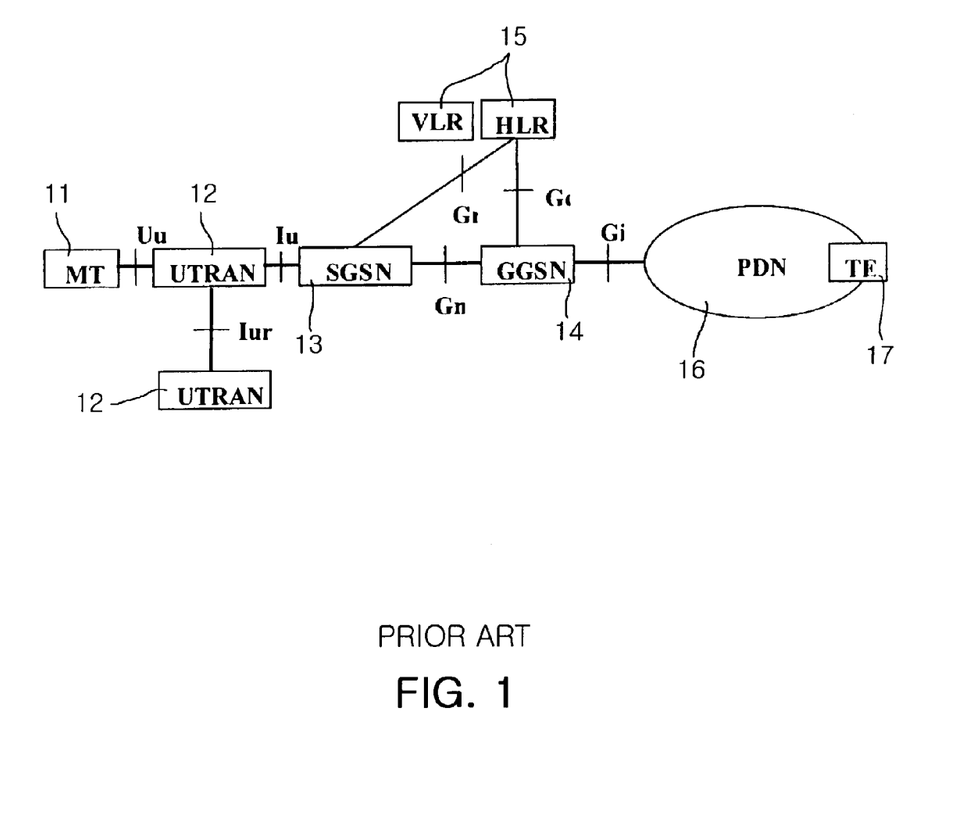
FIG. 1 is a view showing a GPRS (General Packet Radio Services) network architecture based on 3GPP.

FIG. 1 is a view showing a GPRS (General Packet Radio Service) network architecture, which supports packet-mode services of up to several hundred Kbits/s being currently standardized in a 3GPP (Third Generation Partnership Project). The network architecture for only the packet-mode services is shown in FIG. 1, but the SMS (Short Message Service) and the CAMEL (Customized Application for Mobile network Enhanced Logic) as supplementary services are omitted from FIG. 1. Briefly describing components of the GPRS network architecture shown in FIG. 1, a MT (mobile terminal) 11 is a mobile terminal for the packet-mode services and a UTRAN (UTMS Terrestrial Radio Access Network) 12 is a wireless base-station access network in which a UMTS (Universal Mobile Telecommunications System) is employed. Actually, the UTRAN 12 is physically made up of a base station, an RNC (Radio Network Controller) and a connection link between the base station and the RNC. An SGSN (Serving GPRS Support Node) 13 is connected to a plurality of RNCs (not shown) and the SGSN 13 acts as a router for routing a packet between the RNC and a GGSN (Gateway GPRS Support Node) 14. Further, the SGSN 13 performs a mobility management function, a billing data creation function, etc. An interface between the RNCs is called "Iur" where signaling and data paths are directly connected. The "Iur" is used as a packet-forwarding path between a source RNC (an RNC to which a source mobile terminal belongs, before soft-handover is performed) and a target RNC (another RNC to which a destination mobile terminal belongs, after the soft-handover has been performed) when the soft-handover is performed.

The GGSN 14 acts as a router for interfacing with an external network (e.g., an IP (Internet Protocol) network) and a host of a mobile terminal within the GGSN 14. An HLR (Home Location Register)/VLR (Visitor Location Register) 15 manages subscriber information and location information of the mobile terminal. Further, the GGSN 14 is linked to a PDN (Public Data Network) 16 where TEs (Terminal Equipments) 17 are connected.

The GPRS, which is a mobile communication network service for supporting the packet-mode services to a mobile terminal, has been derived from a GSM (Global System for Mobile communications). Packetized data of a maximum 115 Kbits/s at the user terminal (e.g., IP packets) are transferred to a RNC via a radio bearer of a wireless section, then further transferred by the routing function of the RNC to destinations over wired packet networks. The GPRS is provided to the subscriber so that the subscriber transmits and receives data in a packet transfer mode between terminations without using network resources of a line-switching mode. However, the GPRS is complicated because it is made up of two stages. Further, a procedure of transmitting the packet in the GPRS is not efficient because a control signal and a data protocol stack are separated from each other (a reference document: 3GPP TS 23.060, "GPRS Service Description Stage 2", October, 2001).

Korean patent application No. 2000-79533 discloses an IPOW (Internet Protocol Over WDM) architecture for routing/transmitting a packet over a DWDM (Dense Wavelength Division Multiplexing) optical communication network based on a wavelength identification code scheme, and constituent systems and methods for transmitting/receiving the packet in the IPOW architecture. However, there is a disadvantage in that the conventional systems and methods cannot fully solve the problem with packet transmission capability of a wireless access network in terms of core requirements of bandwidth and QoS (quality of service) for Internet services. Further, there is another disadvantage in that the conventional systems and methods have been posed a complexity in implementing high-speed mobility services.

SUMMARY OF THE INVENTION

Therefore, the present invention has been made in view of the above problems, and it is an object of the present invention to provide a method for transmitting a packet in a wireless access network based on a wavelength identification code scheme, the method capable of improving wavelength utilization and simplifying the packet transmission process by assigning a unique wavelength to each of RNCs (Radio Network Controllers) for transmitting and receiving data data packets through the assigned wavelengths, thereby supporting high-speed mobility services.

In accordance with the present invention, the above and other objects can be accomplished by the provision of a method for transmitting a packet in a wireless access network based on a wavelength identification code scheme, comprising the steps of: a) connecting n number of RNCs (Radio Network Controllers) to one sub-ring where the "n" is a positive integer, and assigning a unique wavelength to each RNC; b) transmitting a packet from one RNC to another RNC within the same sub-ring via the SRC (Sub-Ring Controller) of the sub-ring using the assigned unique wavelengths to respective RNCs; c) connecting m number of SRCs to one main-ring where the "m" is a positive integer, and assigning a unique wavelength to each SRC, where the wavelengths used in the sub-rings and main-ring can be totally independently used; and d) encapsulating a wavelength identification code in a packet to be transmitted between the RNCs located within different sub-rings, and routing the packet having the encapsulated wavelength identification code through an MRC (Main-Ring Controller).

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings. In the following description, a variety of specific elements such as constituent elements are shown. The description of such elements has been provided only for a better understanding of the present invention.

Figure 2:
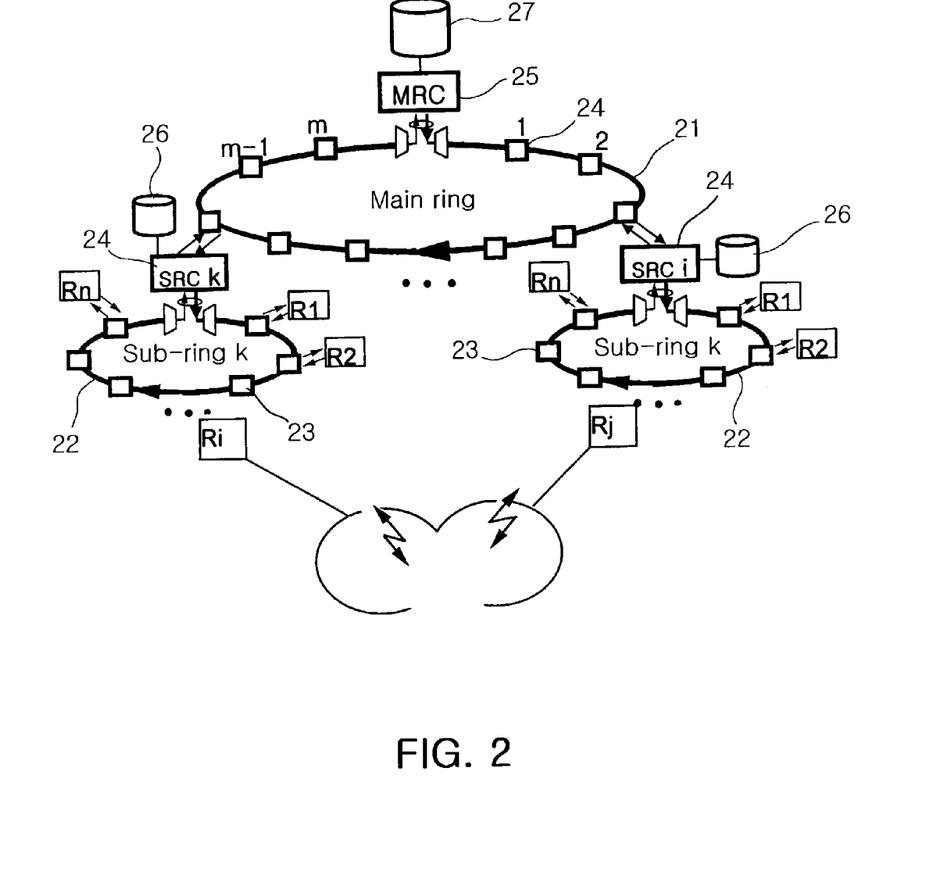
FIG. 2 is a view showing a DWDM (Dense Wavelength Division Multiplexing) wireless access network architecture based on a wavelength identification code scheme as employed in the present invention.

FIG. 2 is a view showing a DWDM (Dense Wavelength Division Multiplexing) wireless access network architecture based on a wavelength identification code scheme as employed in the present invention. As shown in FIG. 2, the wireless access network based on the DWDM scheme comprises an MR (main-ring) 21 and SRs (sub-rings) 22. One sub-ring 22 is connected to n number of RNCs 23 where the "n" is a positive integer and a unique wavelength is assigned to each RNC 23. An area of the sub-rings 22 is similar to that of a line-switched mobile communication switching system, and the packet transmission between the RNCs 23 within the same sub-ring 22 is performed through an SRC (Sub-Ring Controller) 24 having a router function. The main-ring 21 is connected to m number of SRCs 24 where the "m" is a positive integer and a unique wavelength is assigned to each SRC 24. The packet transmission between the sub-rings 22 is performed through an MRC (Main-Ring Controller) 25 having the router function.

When the wireless access network shown in FIG. 2 is compared to the GPRS network shown in FIG. 1, the SRC 24 shown in FIG. 2 is functionally similar to the SGSN 13 shown in FIG. 1, and the MRC 25 shown in FIG. 2 is functionally similar to the GGSN 14 shown in FIG. 1.

The SRCs 24 shares IP addresses of all mobile terminals and assigned wavelength information to SRCs connected to the wireless access network, and subscriber addresses and location information of mobile terminals are obtained from MM (Mobility Management) DBs (Databases) 26. A function of the MM DBs 26 is similar to that of the VLR (Visitor Location Register) included in the GPRS network shown in FIG. 1. The MRC 25 includes an MM DB 27, which has the same information as an MM DB 26 included in an SRC 24. Further, the MM DB 27 included in the MRC 25 acts as a master database for the MM DBs of all the SRCs 24. A function of the MM DB 27 included in the MRC 25 is similar to that of the HLR (Home Location Register) included in the GPRS network shown in FIG. 1.

The number of RNCs connected to the wireless access network is variable according to the number of DWDM wavelengths assigned to the SRCs and the number of wavelengths assigned to the RNCs 23. For example, when a single wavelength is assigned to each of RNCs 23 out of the m number of wavelengths in the sub-ring 22 and a single wavelength is assigned to each of sub-rings 22 out of the n number of wavelengths in the main-ring 20, the number of RNCs 23 included in the wireless access network may be "m×n". Because a larger number of wavelengths can be assigned to an area where the number of mobile subscribers or an amount of traffic being directed to the RNCs 23 is increased, a variable network configuration can be made without additional line costs.

The RNC 23 has a function of a selective add/drop coupler and the RNC 23 can transmit a packet by adding a wavelength assigned to the RNC 23 to other wavelengths running in the sub-ring 22 through the function of the selective add/drop coupler. Further, the RNC 23 can receive the packet by dropping only the wavelength assigned to the RNC from the wavelengths running in the sub-ring. Similarly, a node of the main-ring 21 has the function of the selective add/drop coupler and the node (SRC) can transmit and receive a packet between the sub-rings 22 by adding and dropping the assigned wavelength to the node.

Figure 3:
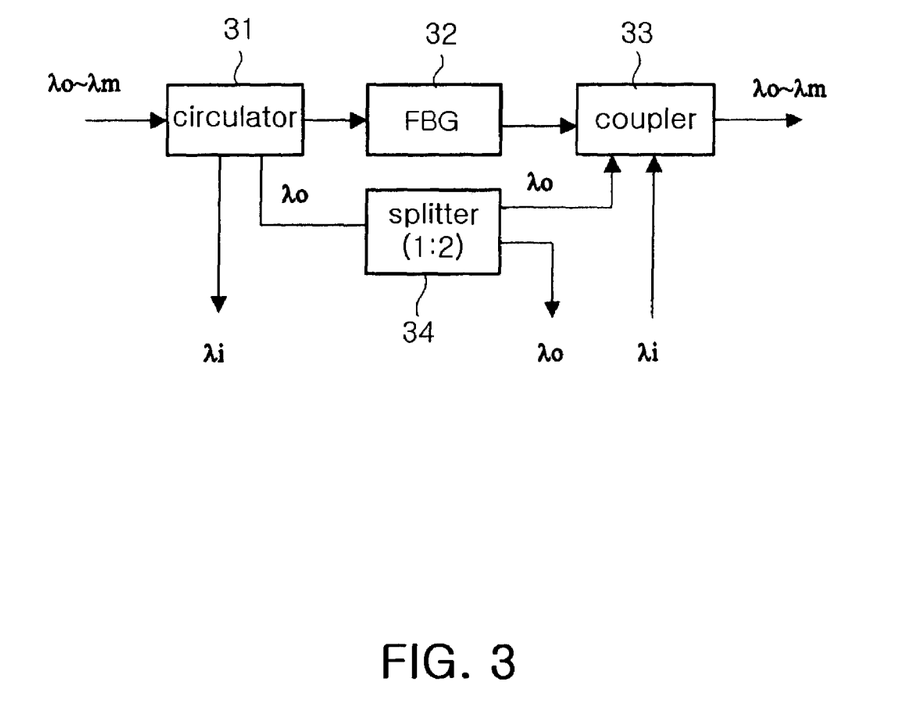
FIG. 3 is a view showing a DWDM interface unit of an RNC (Radio Network Controller) as employed in the present invention.

FIG. 3 is a view showing a DWDM interface unit of an RNC as employed in the present invention. Referring to FIG. 3, signals of wavelengths $\lambda 0 \sim \lambda m$ of the sub-ring 22 shown in FIG. 2 are processed by a circulator 31 and an FBG (Fiber Bragg Grating) unit 32. Only the wavelength $\lambda i$, assigned to a corresponding RNC 23, carrying a data or control signal packet, is dropped from the wavelengths $\lambda 0 \sim \lambda m$. Then, the optical signal of the wavelength $\lambda i$ is converted into electrical signal of the data or control signal packet, and is transmitted to a mobile terminal within the RNC 23 through a radio channel.

Meanwhile, the data or control signal packet from the mobile terminal within the RNC 23 is converted into the optical signal of the wavelength $\lambda i$, and is transmitted to the sub-ring 22 through a coupler 33. A signal of a wavelength $\lambda$ for use in paging or broadcasting a packet should be transmitted to all the RNCs 23. Accordingly, the signal of the wavelength $\lambda 0$ is split into two signals by a 1:2 splitter 34. Here, some of the signal power of the wavelength $\lambda 0$ is directed to the RNCs 23 and the other signal power of the wavelength λ0 gets back to the sub-ring 22 through the coupler 33.

Figure 4:
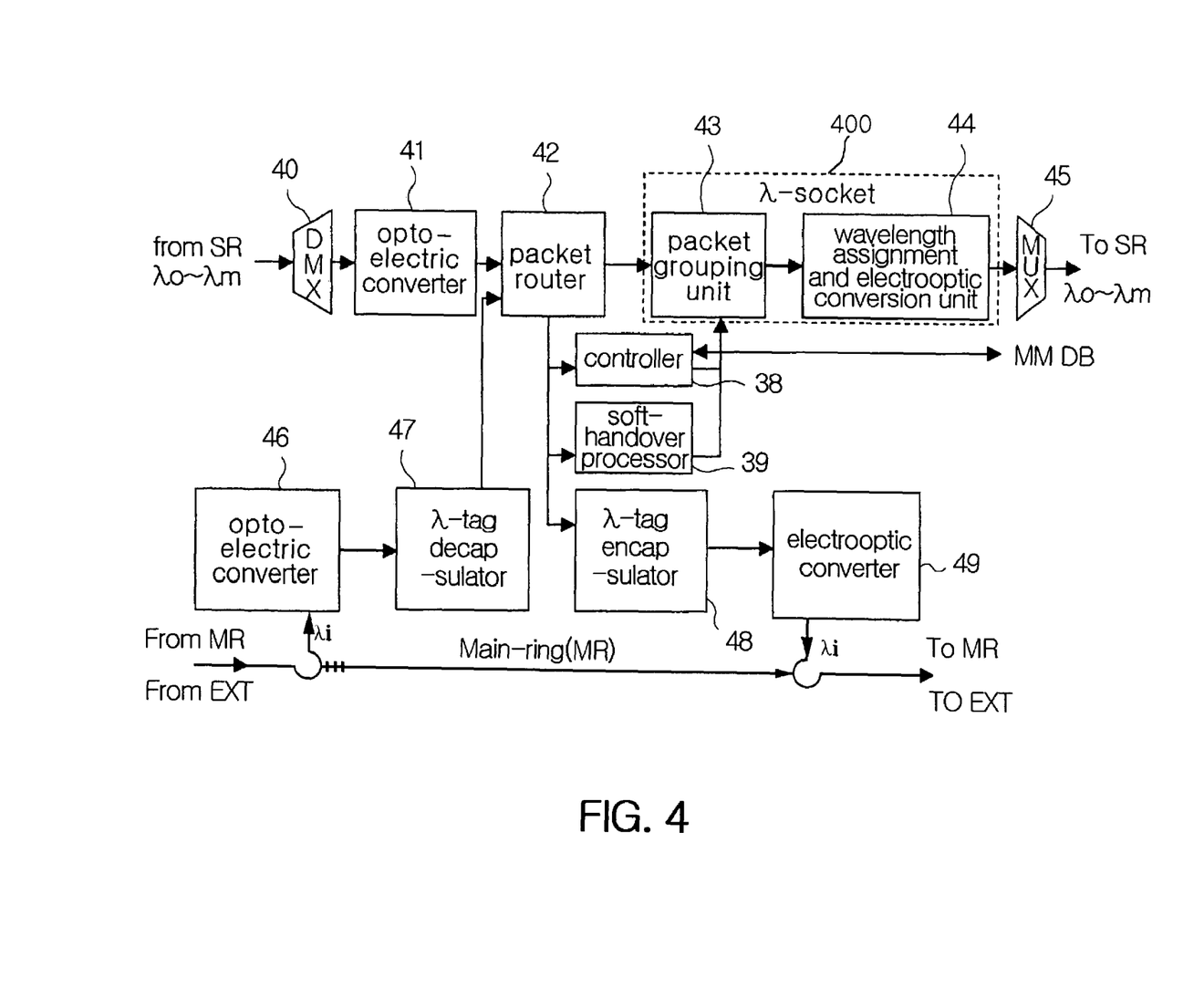
FIG. 4 is a view showing a sub-ring control node as employed in the present invention.

FIG. 4 is a view showing the SRC 24, which is a sub-ring control node, as employed in the present invention. As shown in FIG. 4, the signals of the wavelengths λ0~λm transmitted from the sub-ring 22 are demultiplexed into individual wavelengths by a DEMUX (demultiplexer) 40. The signals of the wavelengths λ0~λm are converted into electrical signals, respectively, by O/E (Optical to Electrical) converters 41, and are inputted into a packet router 42. The packet router 42 determine a routing path trough translating a destination address of the input packet. Where the packet is routed within the same sub-ring 22, a packet-grouping unit 43, located within a λ-socket 400, classifies the packet based on a destination RNC and stores the classified packet in a buffer assigned on a wavelength-by-wavelength basis. Thereafter, a wavelength assignment and E/O (Electrical to Optical) conversion unit 44 assigns a corresponding wavelength to the packet and E/O converts the packet. Upon a system synchronization scheme, the wavelength assignment and conversion unit 44 transmits the signal of the corresponding wavelength carrying the packet to the sub-ring 22 through a MUX (multiplexer) 45. Where the packet is routed between sub-rings 22, a λ-tag encapsulator 48 encapsulates a wavelength identification code, as a λ-tag corresponding to a sub-ring 22 of a reception side, in the packet. A wavelength assignment and conversion unit 44 E/O converts the packet having the wavelength identification code to transmit the packet having the wavelength identification code to the main-ring 21. Meanwhile, a λ-tag decapsulator 47 decapsulates the wavelength identification code as the λ-tag out of the packet received from the main-ring 21. Thereafter, the λ-tag decapsulator 47 transmits the packet to the packet router 42. The packet is transmitted to a corresponding RNC 23 through the packet-grouping unit 43 and the wavelength assignment and conversion unit 44.

Where a type of the packet to be inputted into the packet router 42 corresponds to a control signal packet (which has a specific bit marked to its header), the control signal packet is transmitted to a controller 38, which processes the control signal. The controller 38 analyzes the packet received from the packet router 42, responds to a service request from a mobile terminal, and performs a mobility management procedure according to the service request. That is, where the received packet contains power on/off information and location registration request information of the mobile terminal, the controller 38 updates subscriber information, location information and routing information of the mobile terminal contained in the MM DB 26 of the SRC 24 and then informs the mobile terminal of an update result. Where there is information relating to the MM DB 27 of the MRC 25 such as a location registration request from another sub-ring 22, the controller 38 updates subscriber information, location information and routing information of the mobile terminal contained in the MM DB 26 of the SRC 24. Further, where the received packet corresponds to a service initiation request and an authentication request, the controller 38 determines using the MM DB 26 of the SRC 24 and the MM DB 27 of the MRC 25 whether the service initiation request is proper and the mobile terminal is authenticated. The controller 38 informs the mobile terminal of an authentication result to the service initiation request and the authentication request.

Figure 8:
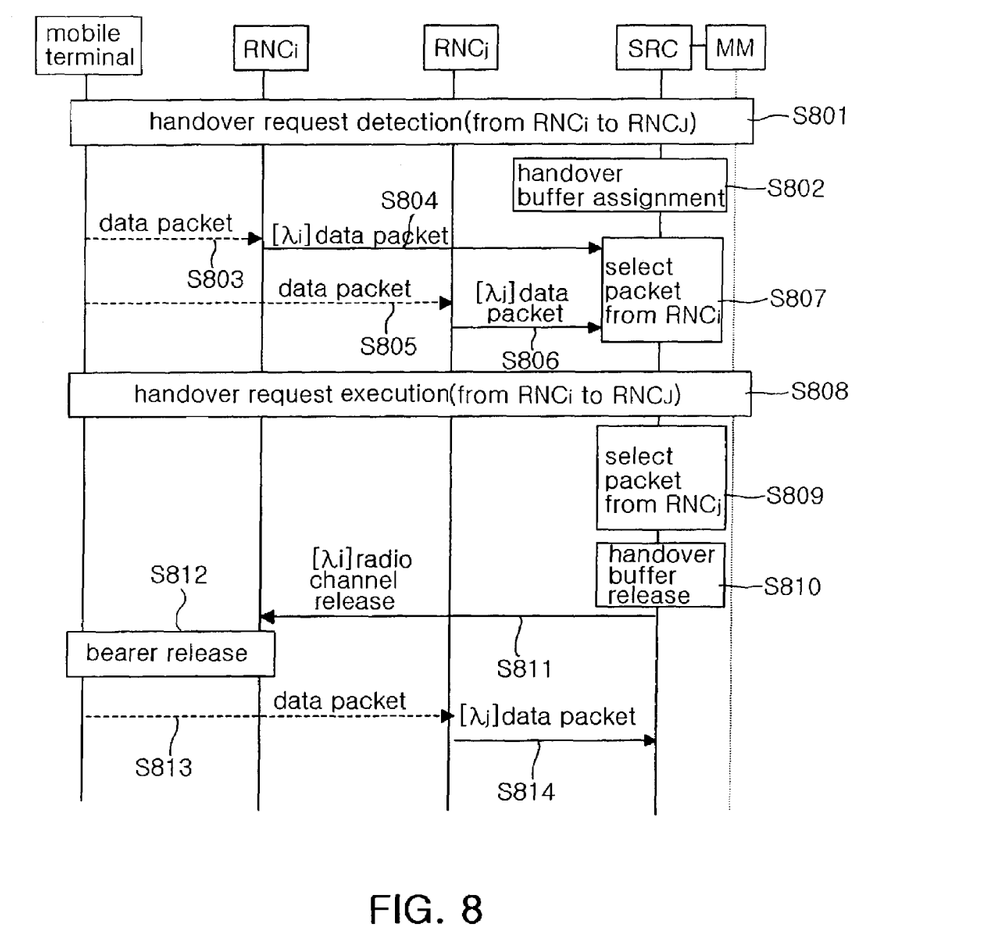
FIG. 8 is a flow chart depicting a procedure of transmitting a handover packet between RNCs located within the same sub-ring in accordance with the present invention.

On the other hand, where a type of the packet to be inputted into the packet router 42 corresponds to a handover packet (which has a specific bit marked in its header), the handover packet is transmitted to a soft-handover processor 39. The soft-handover processor 39 processes a soft-handover between the RNCs 23 within the same sub-ring 22. The soft-handover process is shown in FIG. 8.

Figure 5:
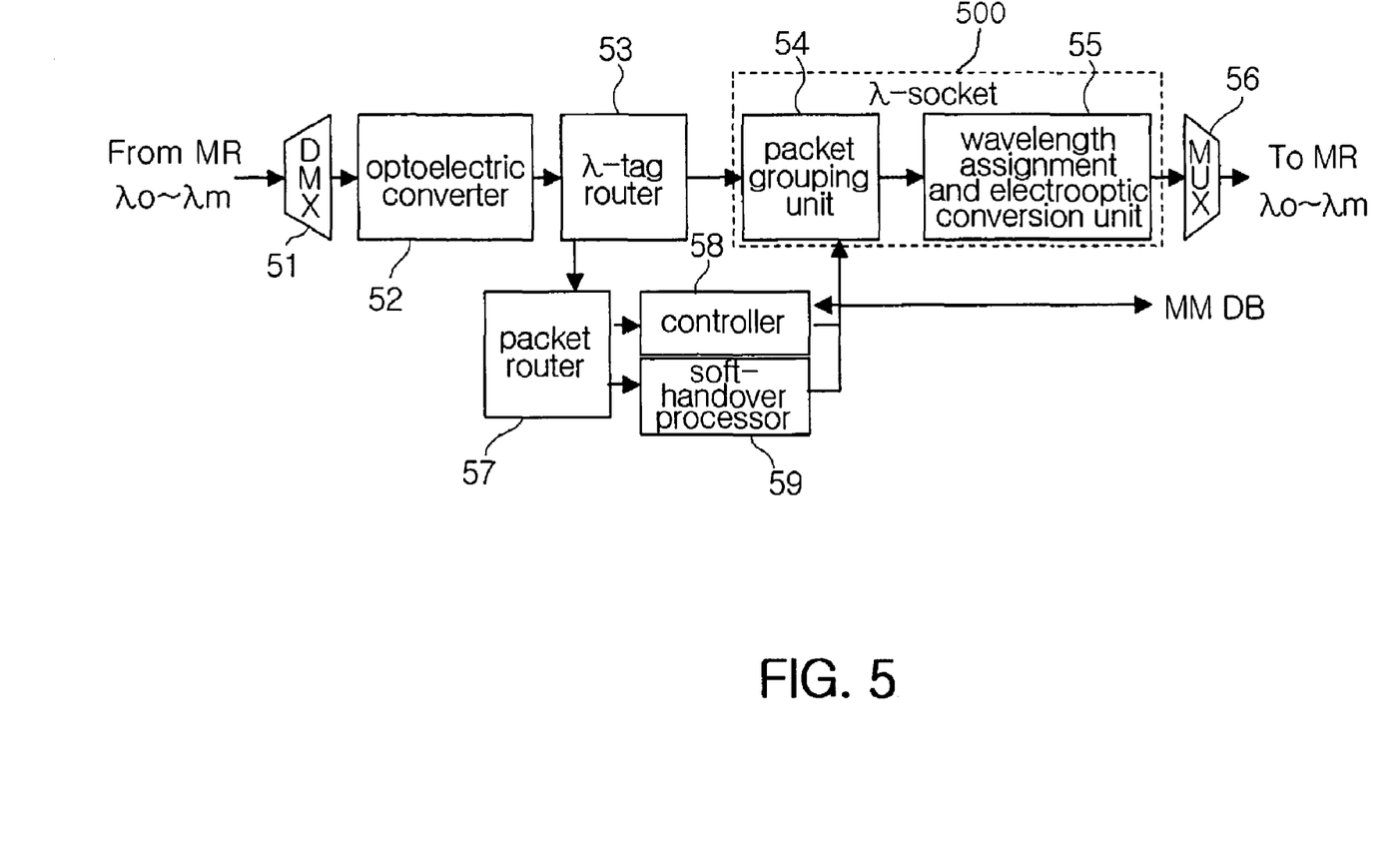
FIG. 5 is a view showing a main-ring control node as employed in the present invention.

FIG. 5 is a view showing the MRC 25, which is a main-ring control node, as employed in the present invention. As shown in FIG. 5, signals of wavelengths λ0~λm from the main-ring 21 are transmitted to a λ-tag router 53 through a DEMUX (demultiplexer) 51 and an O/E converter 52. The λ-tag router 53 checks only the wavelength identification code (the λ-tag) being encapsulated in the packet. Where the wavelength identification code in the packet is marked as a control signal or handover bit, the packet is transmitted to a packet router 57. Other packets, except for the packet described above, are transmitted to a wavelength assignment and conversion unit 55 through a packet-grouping unit 54 located within a λ-socket 500. That is, the packet-grouping unit 54 groups the packets by a destination sub-ring to which a corresponding wavelength is assigned. Signals of wavelengths λ0~λm containing the packets are transmitted to the main-ring 21 after E/O conversion into assigned wavelengths respectively to the packets. Here, the λ-tag becomes a sub-ring identifier and corresponds to a unique wavelength of a corresponding sub-ring. The MRC 25 routes the packet between the sub-rings 22 on the basis of the wavelength identification code of the λ-tag.

The control signal packet is transmitted to a controller 58. The controller 58 updates a subscriber address of the mobile terminal and location information of the mobile terminal in the MM DB 27. Meanwhile, the handover packet is transmitted to a soft-handover processor 59, and the soft-handover processor 59 processes the soft-handover between the sub-rings 22.

Figure 6:
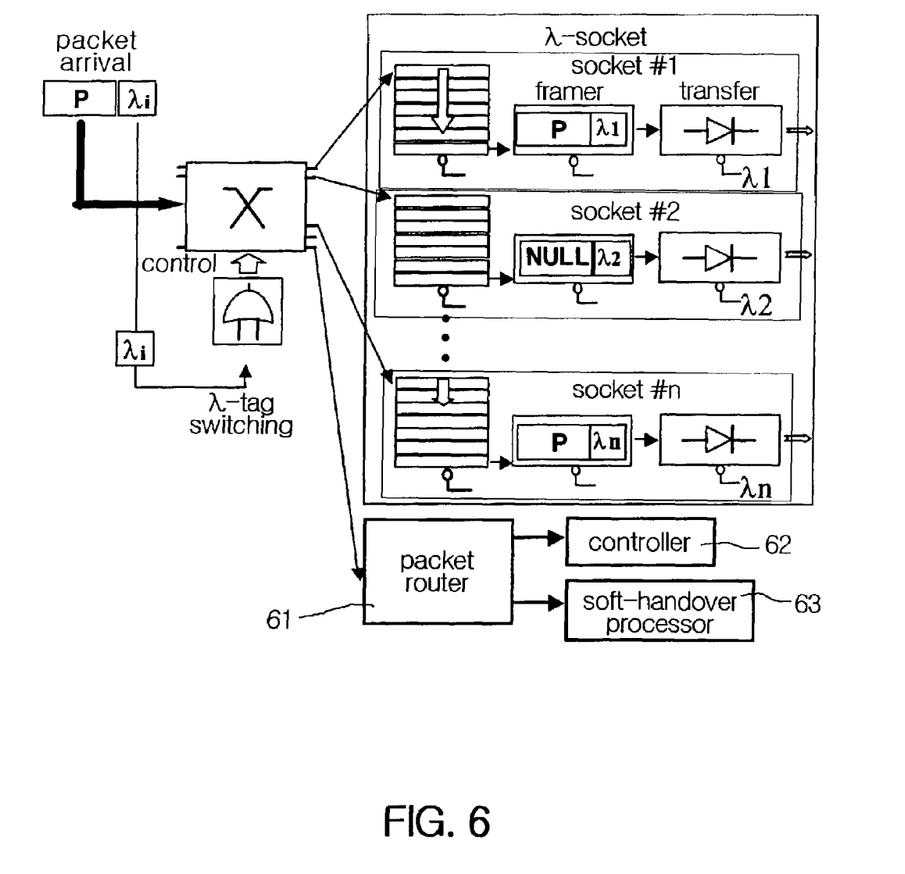
FIG. 6 is a view describing a process of a $\lambda$-socket as employed in the present invention.

FIG. 6 is a view describing a process of a λ-socket as employed in the present invention. As described above, the MRC 25 and the SRC 24 include the λ-sockets 400 and 500, respectively. In the λ-sockets 400 and 500, the packet-grouping units 43 and 54 perform a packet grouping and the wavelength assignment and conversion units 44 and 55 perform E/O conversion into assigned wavelengths. The λ-socket 500 in the MRC 25 assigns a predetermined wavelength on the basis of the wavelength identification code of the λ-tag, while the λ-socket 400 in the MRC 24 assigns the predetermined wavelength on the basis of a destination address of the packet. The λ-tag becomes a sub-ring identifier and corresponds to a unique wavelength of a corresponding sub-ring. A λ-tag decapsulator in the MRC 25 delineates a λ-tag used as a control signal from the packet transmitted from the main-ring 21 and rapidly routes the packet to the buffer assigned on the wavelength-by-wavelength basis, according to the delineated λ-tag as a control signal. The buffer can operate based on a FIFO (First-In First-Out) scheme as a simplest scheme. Upon a system synchronization scheme, the packet stored in the buffer is transmitted to the main-ring 21 through a corresponding wavelength channel. Because an 8-bit long λ-tag alone is enough in switching the packets among over 80 wavelengths, a packet processing load becomes less and a transmission speed becomes improved. Further, because the buffer operates independently from an optical transmitter and a fixed optical wavelength is assigned to the transmitter, a high-speed E/O conversion with wavelength assignment is stably accomplished without using an expensive optical component such as an optical wavelength converter, a tunable light source device or etc. On the other hand, the packet having a control signal or handover λ-tag is transmitted to a packet router 61 and the packet is transmitted to a controller 62 and a soft-handover processor 63 as shown in FIG. 6.

Figure 7:
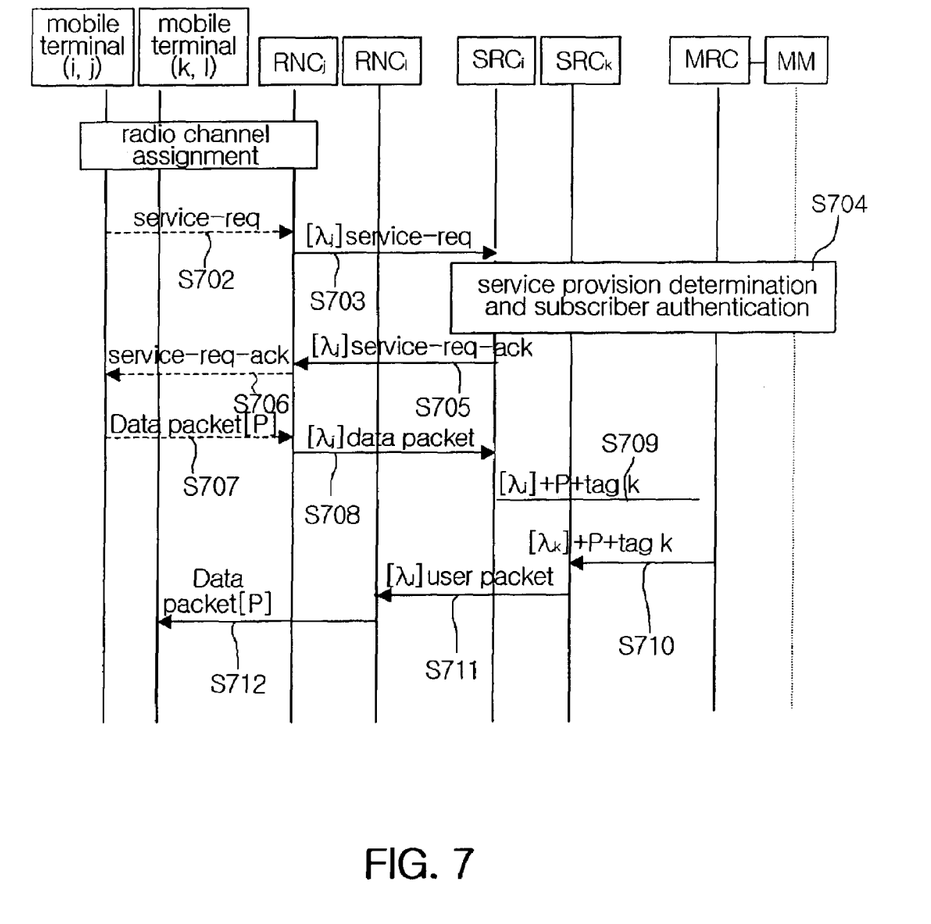
FIG. 7 is a flow chart depicting a procedure of transmitting a packet from a mobile terminal between sub-rings in accordance with the present invention.

FIG. 7 is a flow chart depicting a procedure of transmitting a packet of the mobile terminal between the sub-rings 22 in accordance with the present invention. In other words, FIG. 7 is a detailed flow chart depicting a procedure of transmitting the packet between mobile terminals of different sub-rings 22 in a DWDM radio packet network based on a wavelength identification code scheme. A procedure of transmitting the packet from an MT (mobile terminal) (i,j), relating to a source sub-ring $SR_i$ and an $RNC_j$, to an MT (k,l), relating to a destination sub-ring $SR_k$ and an $RNC_l$, will be described as follows.

The MT (i,j) establishes a radio channel with the $RNC_j$ prior to transmitting packets at step S701. Through the radio channel established a service request (service_req) packet is transmitted to $RNC_j$ at step S702. Then the $RNC_j$ transmits the service request (service_req) packet on a wavelength $\lambda_j$ to an $SRC_i$ at step S703. The $SRC_i$ determines whether the packet is the service request (service_req) packet through an analysis on the address of the packet, and performs a subscriber authentication procedure with an MM DB located within the $SRC_i$ and an MM DB located within an MRC at step S704. Upon the subscriber authentication procedure being completed, the $SRC_i$ transmits a service request acknowledgement (service_req_ack) packet to the $RNC_j$ on a wavelength $\lambda_j$ at step S705. Then, the $RNC_j$ transmits the service request acknowledgement (service_req_ack) packet to the MT (i,j) through the radio channel at step S706.

Then, the MT (i,j) transmits a data packet P to the $RNC_j$ at step 707. The $RNC_j$ transmits the data packet P to the $SRC_i$ on a wavelength $\lambda_j$ at step S708. The $SRC_i$ receives the data packet P on the wavelength $\lambda_j$ and analyzes the destination address of the data packet P. If the destination address corresponds to any mobile terminal within the destination sub-ring $SR_k$, which is different from the source sub-ring $SR_i$, the $SRC_i$ encapsulates a unique $\lambda$-tag k ($L_k$) indicating the destination sub-ring $SR_k$ in the data packet P and transmits the data packet P and the tag k on a wavelength $\lambda_i$ to the main-ring 21 at step S709. Here, the wavelength $\lambda_i$ is uniquely assigned for the communication between $SRC_i$ and MRC through the main-ring.

Then, the MRC routes with a hardware logic the data packet P to the $k^{th}$ buffer based on the $\lambda$-tag ($L_k$) delineated from the ($P+L_k$) packet. Then, with a system synchronization scheme, the MRC transmits the data packet P and the $L_k$ ($P+L_k$) on a wavelength $\lambda_k$ to the main-ring 21 at step S710. Only the wavelength $\lambda_k$ containing the data packet P and the tag k ($L_k$) drops at the $SRC_k$. Then, the $SRC_k$ removes the tag k, analyzes a destination address from the data packet P, and transmits the data packet P to the $SR_k$ on a wavelength $\lambda_l$ determined according to the destination address of P at step S711. The wavelength $\lambda_l$ containing the data packet P drops at the $RNC_l$ which transmits the data packet P to the MT (k,l) at step S712.

FIG. 8 is a flow chart depicting a procedure of transmitting a handover packet between RNCs located within the same sub-ring in accordance with the present invention. In other words, FIG. 8 is a detailed flow chart for transmitting the packet between mobile terminals connected to different RNCs within the same sub-ring in a DWDM radio packet network based on a wavelength identification code scheme.

First, it is assumed that an RNC before MT handover is referred to as an "$RNC_i$," and another RNC after MT handover is referred to as an "$RNC_j$". If the MT moves into an overlap cell area of the $RNC_i$ and the $RNC_j$ while packet services are provided to the MT, the MT triggers a handover request signal to the $RNC_i$ and $RNC_j$. A packet having the triggered handover request is transmitted on wavelength $\lambda_i$ from $RNC_i$ to the SRC. The SRC analyzes the packet and identifies the handover request signal at step S801. Then, the SRC assigns a buffer for handover at step S802. Data packets corresponding to the MT are simultaneously transmitted from $RNC_i$ and the $RNC_j$ to the SRC at steps S803 to S806. The data packets are stored in the buffer. Before the handover execution trigger signal is generated, a handover processing block of the SRC selects only the data packet from the $RNC_i$ and transmits the selected data packet to the destination sub-ring at step S807.

If the MT further moves from a cell of the $RNC_i$ to a cell of the $RNC_j$ and reaches a critical point for the handover, a handover execution trigger signal is transmitted from the MT to the SRC through the $RNC_i$ and the $RNC_j$ at step S808. The handover processing block selects only the data packet from the $RNC_j$ and transmits the selected data packet to the destination sub-ring at step 809.

Thereafter, the SRC releases the buffer assigned for the handover at step S810 and transmits a radio channel release signal to the $RNC_i$ at step S811. Radio bearer between the MT and the $RNC_i$ is released at step S812. The radio channel established between the MT and the $RNC_i$ as the previous RNC for the MT before the handover is released at step S813. Thereafter, the MT transmits the data packet to the SRC through the $RNC_j$ at step S814.

In a manner similar to the above-description, a handover between different sub-rings can be performed. However, there is a difference in that only a handover processing block of the MRC performs the packet selection in the handover between the different sub-rings.

As apparent from the above-description, the present invention provides a method capable of guaranteeing a bandwidth by assigning a unique wavelength to each of RNCs, improving access network utilization, and simplifying packet transmission by transmitting/receiving a packet being identified by the unique wavelength, in a large-capacity wireless access network, which supports wireless Internet services of more than several Mbits/s per mobile terminal subscriber.

Further, the method can provide high-speed paging and broadcasting services, support high-speed mobility services and simplify soft-handover packet transmission by commonly assigning a specific shared wavelength to all RNCs.

Furthermore, the method makes it possible to implement a stable and economical wireless access network, more than a conventional ATM/SDH/SONET interface and a conventional point-to-point network.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, the present invention is not limited to the above-described embodiments and the accompanying drawings, but the present invention is defined by the claims.

What is claimed is:

1. A method for transmitting a packet in a wireless access network based on a wavelength identification code scheme, comprising the steps of:
   a) connecting n number of RNCs (Radio Network Controllers) to one sub-ring where the "n" is a positive integer, and assigning a unique wavelength to each RNC;
   b) transmitting a packet from one RNC to another RNC via a SRC (Sub-Ring Controller) of the sub-ring by distinguishing the packet using the assigned unique wavelengths within the sub-ring;
   c) connecting m number of SRCs to one main-ring where the "m" is a positive integer, and assigning a unique wavelength to each SRC; and d) encapsulating a wavelength identification code in a packet to be transmitted between the RNCs located within different sub-rings, and routing the packet having the encapsulated wavelength identification code through an MRC (Main-Ring Controller).

2. The method according to claim 1, wherein the SRC and MRC have router functions.

3. The method according to claim 2, wherein the SRC and MRC perform MM (Mobility Management).

4. The method according to claim 1, wherein the SRC and MRC perform MM (Mobility Management).

5. The method according to claim 4, wherein the SRC and MRC process a mobility management signal as an IP (Internet Protocol) packet without further signal link and protocol.

6. The method according to claim 4, wherein the SRC and MRC have MM databases, the MM databases sharing IP addresses of all the mobile terminals connected to the wireless access network and assigned-wavelength information for the sake of the MM and providing subscriber addresses of the mobile terminals and location information.

7. The method according to claim 1, wherein a signal or data packet to be transmitted to the RNCs is carried with a specific shared wavelength.

8. The method according to claim 1, wherein the RNC transmits or receives the packet by adding or dropping only the unique wavelength assigned to the RNC among wavelengths from the sub-ring using a selective add/drop coupler.

9. The method according to claim 1, wherein the MRC routes the packet between the sub-rings on the basis of the wavelength identification code ($\lambda$-tag) indicating the unique wavelength of a destination sub-ring.

10. The method according to claim 1, wherein the SRC transmits or receives the packet by adding or dropping only the unique wavelength assigned to the SRC among wavelengths from the main-ring using a selective add/drop coupler.

11. The method according to claim 1, further comprising the steps of:
   e) assigning a specific wavelength to the sub-ring and transmitting the packet, where the packet for paging or broadcasting, to all the RNCs located within the same sub-ring; and
   f) assigning a specific wavelength to the main-ring and transmitting the packet, where the packet for paging or broadcasting, to all the SRCs.

12. The method according to claim 1, wherein the step a) includes the steps of:
   a-1) allowing the RNC to drop only a wavelength $\lambda_i$ assigned to the RNC among wavelengths $\lambda 0 \sim \lambda m$ from the sub-ring and to O/E convert the signal of the wavelength $\lambda_i$ and transmitting a data or signal packet to a mobile terminal connected to the RNC;
   a-2) E/O converting the data or signal packet from the mobile terminal connected to the RNC, and transmitting the optical signal of the wavelength $\lambda_i$ carrying the data or signal packet to the sub-ring through a coupler; and
   a-3) splitting signal power of a wavelength $\lambda 0$ for paging and broadcasting into two branches using a 1:2 splitter, the two branches having one is connected to the RNC and the other returns to the sub-ring through the coupler.

13. The method according to claim 1, wherein the step b) includes the steps of:
   b-1) allowing the SRC to multiplex and O/E convert signals of wavelengths $\lambda 0 \sim \lambda m$ from the sub-ring and to translate a destination address of the packet to decide a routing path of the packet;
   b-2) updating a subscriber address and location information of a mobile terminal stored in an MM database;
   b-3) if the IP (Internet Protocol) packet is routed in the same sub-ring, classifying the IP packet on an RNC-by-RNC basis, storing the IP packet in a buffer assigned on a wavelength-by-wavelength basis, E/O converting the IP packet stored in the buffer and multiplexing the optical signal with other optical signals of different wavelengths, and transmitting the optical signals to the sub-ring under a scheme of system synchronization;
   b-4) if the IP packet is routed to another sub-ring different from the sub-ring, encapsulating the IP packet with a wavelength identification code corresponding to the destination sub-ring, E/O converting the IP packet having the wavelength identification code, and transmitting the optical signal to the main-ring;
   b-5) detaching the wavelength identification code from the encapsulated packet transmitted from the main-ring, E/O converting the IP packet with the assigned unique wavelength corresponding to a destination RCN, and transmitting the optical signal of the unique wavelength to the destination RCN; and
   b-6) if a handover request signal is received from a MT, assigning buffers for handover to store data packets transmitted by source and destination RNCs, selecting a data packet transmitted by the source RNC to transmit the data packet from the source RNC to the sub-ring before the handover, selecting a data packet transmitted by the destination RNC to transmit the data packet from the destination RNC to the sub-ring after the handover, and releasing the assigned buffers.

14. The method according to claim 1, wherein the step d) includes the steps of:
   d-1) allowing the MRC to demultiplex and O/E convert optical signals of wavelengths $\lambda 0 \sim \lambda m$ from the main-ring and to identify a wavelength identification code from an encapsulated IP packet;
   d-2) if the wavelength identification code corresponds to a control signal packet, updating a subscriber address and location information of a mobile terminal stored in an MM database;
   d-3) if the wavelength identification code corresponds to a handover bit packet, processing handover between the sub-rings; and
   d-4) if the wavelength identification code corresponds to another packet, except for the control signal packet and the handover bit packet, classifying the packet by the destination sub-ring to which a corresponding wavelength is assigned, and E/O converting the packet and transmitting the signal of the assigned wavelength to the main-ring.

15. The method according to claim 14, wherein the MRC routs the packet between the sub-rings on the basis of the wavelength identification code ($\lambda$-tag) indicating the unique wavelength of a destination sub-ring.

16. The method according to claim 1, wherein the step d) includes the steps of:
   d-1) allowing the MRC to delineate a ($\lambda$-tag) as a wavelength identification code encapsulated in the packet received from the main-ring using a ($\lambda$-tag) delineator and to route the IP packet to the buffer, to which a unique wavelength is assigned according to the destination sub-ring, using the delineated ($\lambda$-tag) as a control signal;
   d-2) transmitting a signal of a corresponding wavelength carrying the IP packet to the main-ring in response to a system synchronization signal; and d-3) analyzing an address of the IP packet, updating a subscriber address and location information of a mobile terminal stored in an MM database according to the ($\lambda$-tag) indicating mobility management signal or handover data, and processing soft-handover between the sub-rings.

17. The method according to claim 16, wherein the MRC routes the packet between the sub-rings on the basis of the wavelength identification code ($\lambda$-tag) indicating to the unique wavelength of a destination sub-ring.

18. The method according to claim 1, wherein the wavelengths used in the sub-rings and main-ring can be totally independently used.

* * * * *